(12) United States Patent
Zhang (10) Patent No.: US 9,839,981 B2
(45) Date of Patent: Dec. 12, 2017

(54) POSITIONING DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Bing-Jun Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 297 days.

(21) Appl. No.: 14/713,939

(22) Filed: May 15, 2015

(65) Prior Publication Data

US 2016/0195380 A1 Jul. 7, 2016

(30) Foreign Application Priority Data

Jan. 5, 2015 (CN) .................. 2015 2 0003119 U (51) Int. Cl.
| | |
|---|---|
| *B23Q 17/00* | (2006.01) |
| *B23Q 3/18* | (2006.01) |
| *B23Q 16/00* | (2006.01) |
| *B25B 11/00* | (2006.01) |
| *G01B 3/00* | (2006.01) |
| *G01B 5/20* | (2006.01) |
| *G01B 5/25* | (2006.01) |

(52) U.S. Cl.
CPC ............. *B23Q 17/006* (2013.01); *B23Q 3/18* (2013.01); *B23Q 16/001* (2013.01); *B25B 11/00* (2013.01); *G01B 3/00* (2013.01); *G01B 3/002* (2013.01); *G01B 5/20* (2013.01); *G01B 5/25* (2013.01)

(58) Field of Classification Search
CPC . G01B 3/002; G01B 5/20; G01B 5/25; G01B 3/00; B23Q 3/18; B23Q 17/006; B25B 11/00
USPC ......... 33/295, 454, 464, 562, 563, 613, 645, 33/699, 549–555; 269/54.4, 278, 269/292–294, 37, 266; 29/281.1
See application file for complete search history.

(56) References Cited

U.S. PATENT DOCUMENTS

| | | | | |
|---|---|---|---|---|
| 2,652,866 A | * | 9/1953 | Drain ..................... | B23Q 35/44 144/144.51 |
| 3,093,906 A | * | 6/1963 | Cohara .................... | B43L 5/00 33/430 |
| 3,626,600 A | * | 12/1971 | Gaither ................ | B23Q 16/001 269/10 |
| 3,813,789 A | * | 6/1974 | Shelton ................ | G01B 5/0002 33/503 |

(Continued)

*Primary Examiner* — R. A. Smith
*Assistant Examiner* — Tania Courson
(74) *Attorney, Agent, or Firm* — ScienBiziP, P.C.

(57) ABSTRACT

A positioning device includes a support member configured to carry a workpiece, a plurality of pins positioned on the support member, and a plurality of telescoping mechanisms positioned on the support member. Each of the telescoping mechanisms comprises a driving member and a rotating member connected to the driving member. The positioning pins slidably pass through the support member and are pivotably connected to an opposite end of the rotating member. The rotating member rotates relative to the support member via the driving member to adjust an extending length of the positioning pins relative to the support member.

12 Claims, 7 Drawing Sheets

(56) References Cited

U.S. PATENT DOCUMENTS

| | | | | |
|---|---|---|---|---|
| 4,593,476 A * | 6/1986 | Clark | ............... | G01B 5/0004 |
| | | | | 33/529 |
| 4,867,427 A * | 9/1989 | Cunningham | ........ | B25B 5/003 |
| | | | | 269/166 |
| 5,026,033 A * | 6/1991 | Roxy | ............... | B23Q 3/103 |
| | | | | 269/309 |
| 5,481,811 A * | 1/1996 | Smith | ............... | B23Q 3/103 |
| | | | | 269/88 |
| 5,625,959 A * | 5/1997 | Ercole | ............ | G01B 5/0002 |
| | | | | 33/568 |
| 5,653,038 A * | 8/1997 | Hunter | ........... | B23Q 1/0063 |
| | | | | 269/900 |
| 5,829,151 A * | 11/1998 | Collier | ............ | B23Q 7/14 |
| | | | | 33/1 M |
| 6,298,572 B1 * | 10/2001 | McAuley | ......... | G01B 5/0002 |
| | | | | 269/37 |
| 6,371,469 B1 * | 4/2002 | Gray | ............. | B23Q 3/068 |
| | | | | 269/234 |
| 7,698,829 B2 * | 4/2010 | Lutz | .............. | B23Q 1/0054 |
| | | | | 33/1 M |
| 7,877,889 B2 * | 2/2011 | Griffin, Jr. | ......... | E04G 21/185 |
| | | | | 249/155 |
| 9,581,424 B2 * | 2/2017 | Takanashi | ......... | G01B 5/201 |

\* cited by examiner

POSITIONING DEVICE

FIELD

The subject matter herein generally relates to positioning devices.

BACKGROUND

When machining workpieces, a size and levelness and position of the workpiece needs to be detected. It is very important to position the workpiece properly.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape or other feature that the term modifies, such that the component need not be exact. For example, "substantially cylindrical" means that the object resembles a cylinder, but can have one or more deviations from a true cylinder. The term "comprising," when utilized, means "including, but not necessarily limited to", it specifically indicates open-ended inclusion or membership in the so-described combination, group, series and the like.

The present disclosure is described in relation to a positioning device.

Figure 1:
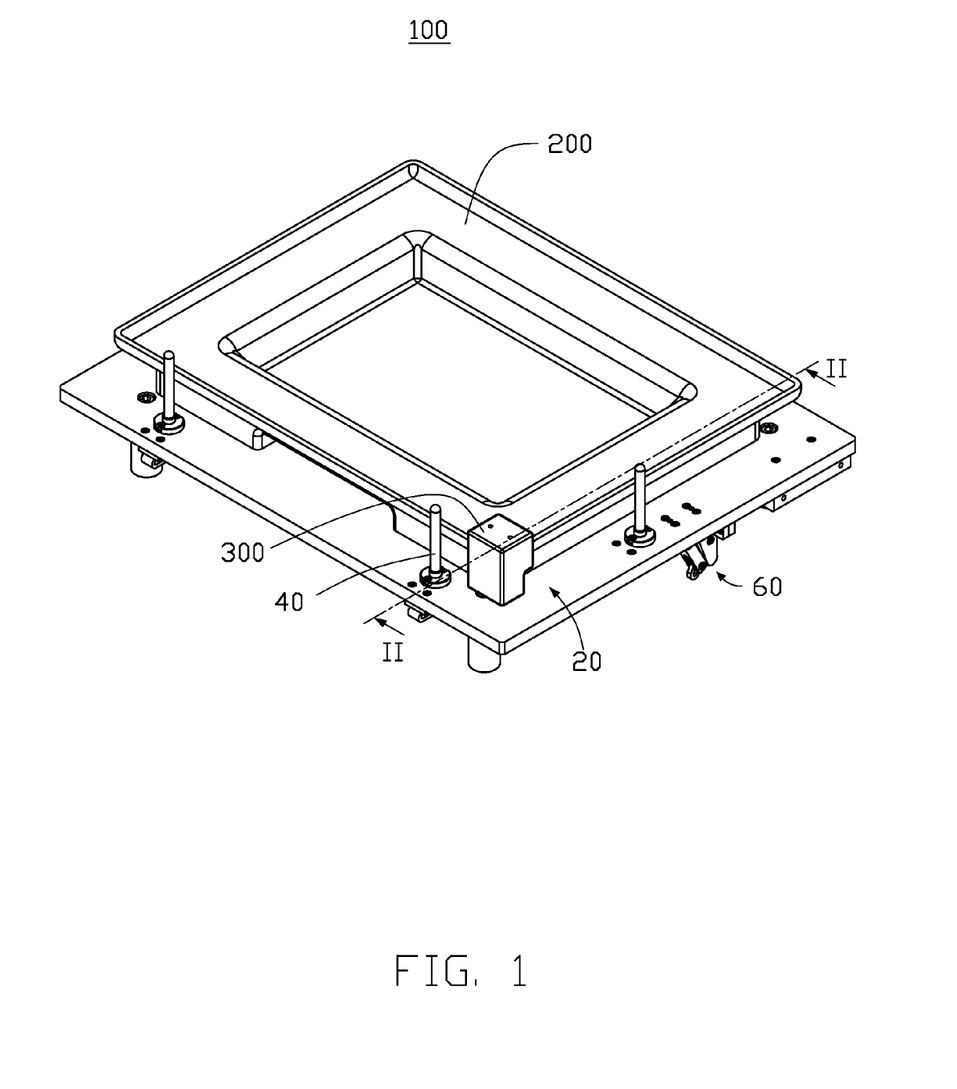
FIG. 1 is an isometric view of an embodiment of a positioning device and a workpiece.

FIG. 1 illustrates an embodiment of a positioning device 100 configured to position and conveniently detect a workpiece 200 using a sensor 300. The positioning device 100 can include a support member 20 configured to support the workpiece 200, a plurality of pins 40 positioned on the support member 20, and a plurality of telescoping mechanisms 60. The pins 40 can be slidably passed through the support member 20 and can be configured to position the workpiece 200. The telescoping mechanisms 60 can be positioned on a surface (not labeled) of the support member 20 away from the workpiece 200. The telescoping mechanisms 60 can be connected to the pins 40 to adjust an extending distance of the pins 40 relative to the support member 20.

Figure 2:
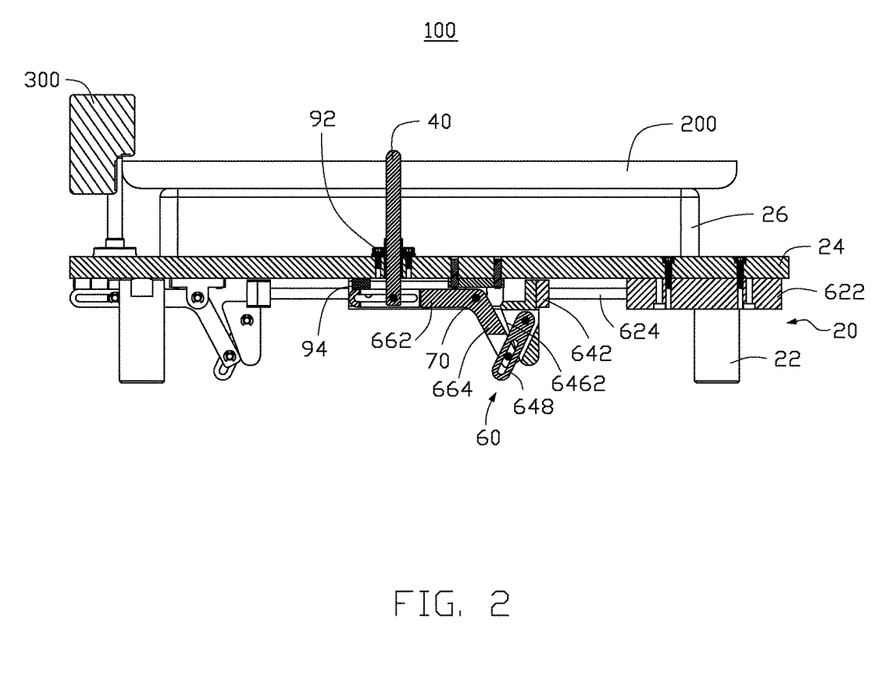
FIG. 2 is a cross-sectional view of the positioning device of FIG. 1 along line II-II.
Figure 3:
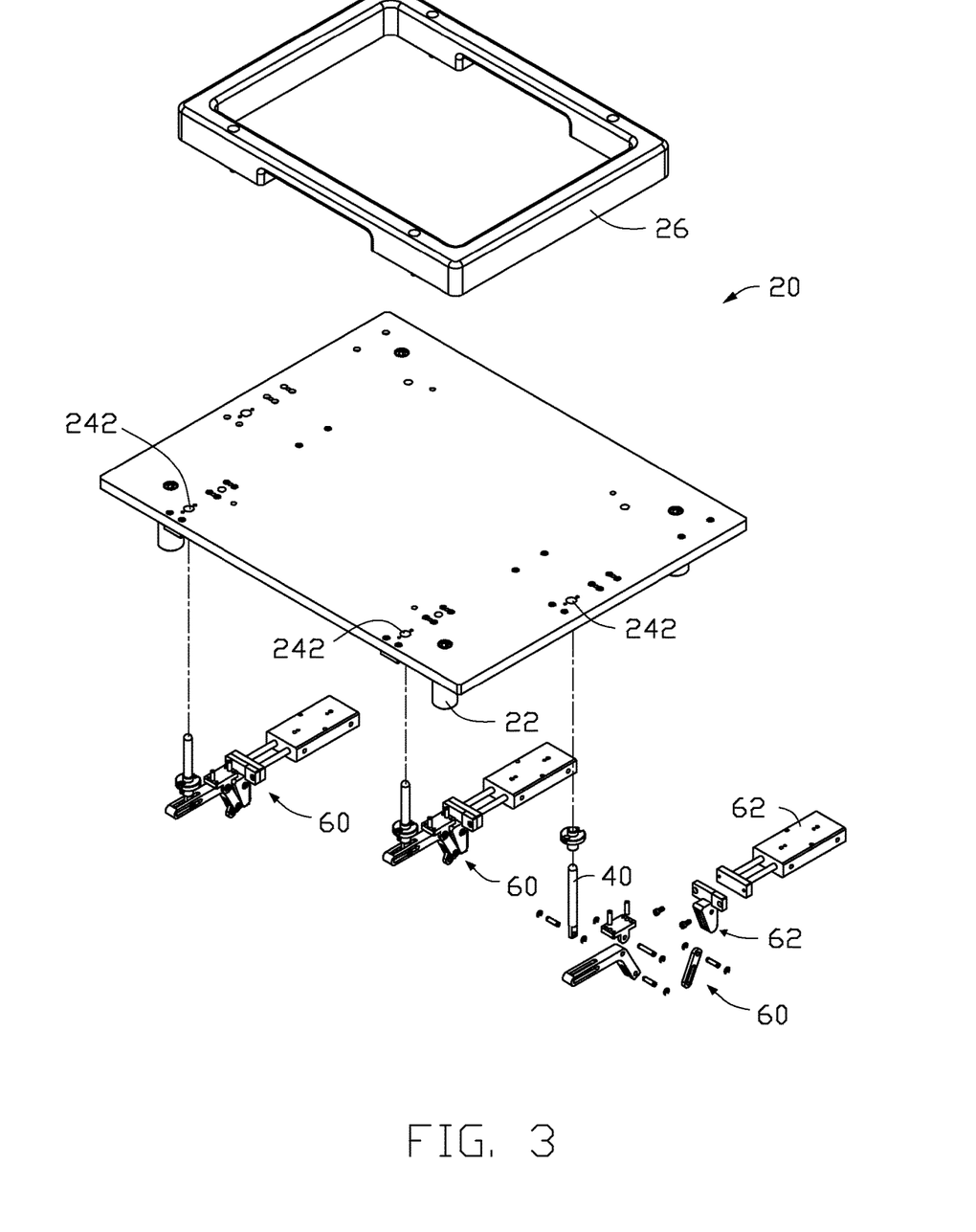
FIG. 3 is an exploded, isometric view of the positioning device of FIG. 1.
Figure 4:
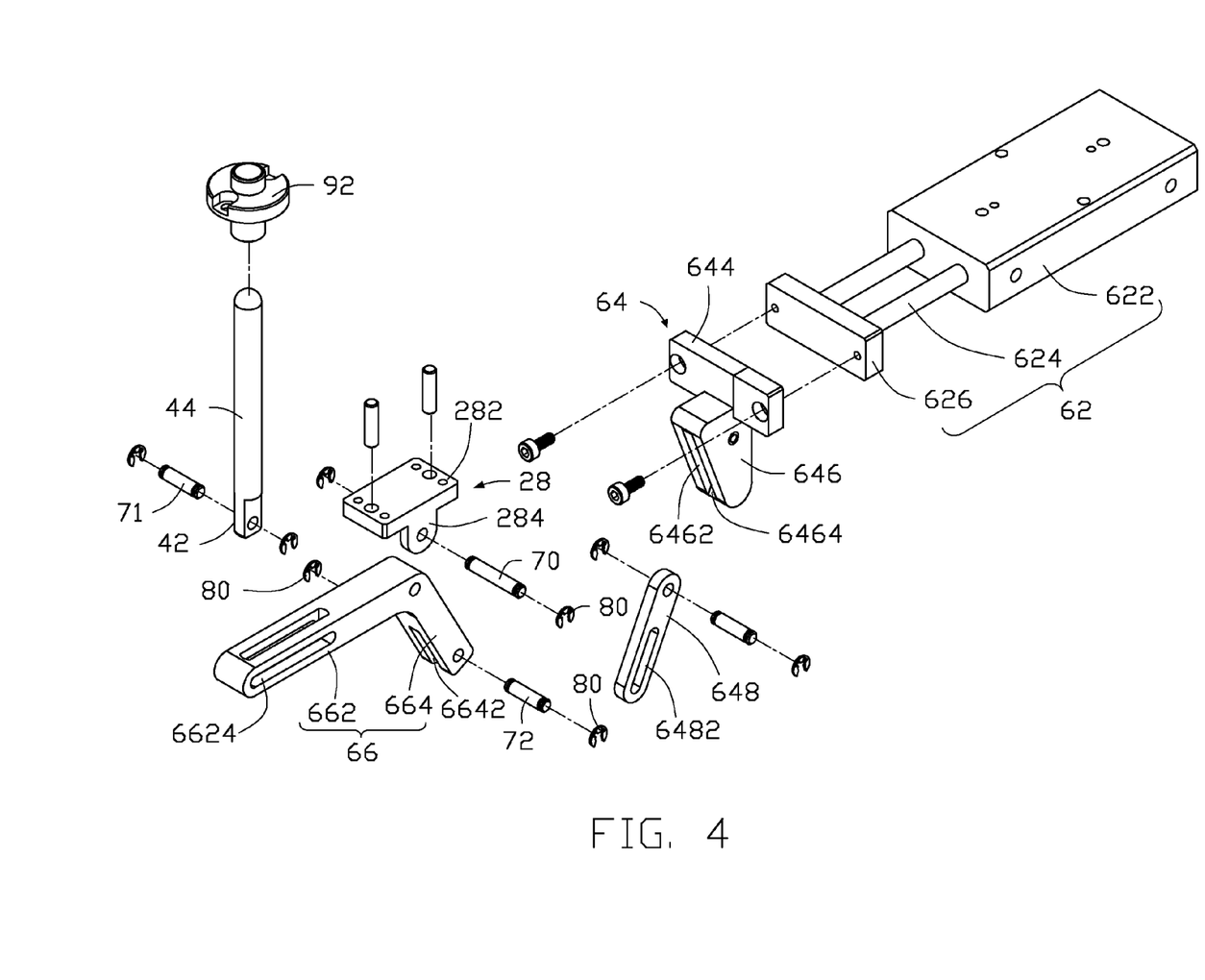
FIG. 4 is an exploded, isometric view of a telescoping mechanism and an assembling base the positioning device of FIG. 3.

FIGS. 2 to 4 illustrate that the support member 20 can include a plurality of support columns 22, a fastening plate 24, and a heel block 26. The support columns 22 can be positioned on a surface (not labeled) of the fastening plate 24 away from the workpiece 200. The heel block 26 can be positioned on an opposite surface (not labeled) of the fastening plate 24. A plurality of positioning holes 242 can be defined in the fastening plate 24 to assemble the pins 40. The positioning holes 242 can pass through the fastening plate 24 and can be adjacent to a periphery of the fastening plate 24. The heel block 26 can be configured to support the workpiece 200. The heel block 26 can be made of flexible material to prevent the workpiece 200 from scratching.

In the illustrated embodiment, a number of the positioning pins 40 can be three. Each of the positioning pins 40 can slidably pass through the positioning holes 242. Each of the positioning pins 40 can include a fastening end 42 and a positioning end 44. The fastening end 42 can be connected to the telescoping mechanisms 60. The positioning end 44 can extend out of the fastening plate 24 to position the workpiece 200. The support member 20 can further include a plurality of guide sleeves 92. Each of the guide sleeves 92 can be positioned in the corresponding positioning hole 242 to guide the positioning pins 40.

The telescoping mechanisms 60 can be positioned on a surface (not labeled) of the fastening plate 24 away from the heel block 26. In the illustrated embodiment, three telescoping mechanisms 60 can be spaced from each other on the fastening plate 24 to control the positioning pins 40. Each of the telescoping mechanisms 60 can include a driving member 62, a connecting member 64, and a rotating member 66. The driving member 62 and the rotating member 66 can be positioned on a surface (not labeled) of the fastening plate 24 away from the heel block 26. The connecting member 64 can be connected to the driving member 62 and the rotating member 66.

The driving member 62 can include a first main body 622, an axle 624, and an assembling block 626. The first main body 622 can be positioned on a surface (not labeled) of the fastening plate 24 away from the heel block 26. The axle 624 can be slidably positioned on an end of the first main body 622. The assembling block 626 can substantially be a rectangular plate. The assembling block 626 can be positioned on an end of the axle 624 away from the first main body 622. The assembling block 626 can be driven by the first main body 622.

The connecting member 64 can include a connecting block 642 and a connecting rod 648. The connecting block 642 can be positioned on the assembling block 626. The connecting rod 648 can be pivotably connected to a side of the connecting block 642 away from the driving member 62. The connecting block 642 can include a second main body 644 and a projection portion 646 positioned on the second main body 644. The second main body 644 can be a substantially rectangular plate and can be connected to the assembling block 626. The projection portion 646 can include an inclining plane 6462. The inclining plane 6462 can be positioned on a side of the projection portion 646 away from the driving member 62. A groove 6464 can be defined on the inclining plane 6462. An end of the connecting rod 648 can be inserted into the groove 6464 and can be pivotably connected to the projection portion 646. A through groove 6482 can be defined on an opposite end of the connecting rod 648 away from the inclining plane 6462. The through groove 6482 can extend along a length of the connecting rod 648.

The rotating member 66 can include a linkage portion 662 and a resisting portion 664 connected to the linkage portion 662. The resisting portion 664 can be bent and extend from an end of the linkage portion 662. An angle of the linkage portion 662 and the resisting portion 664 can be an obtuse angle. The linkage portion 662 can be pivotably connected to the fastening end 42 of the positioning pins 42. A free end of the resisting portion 664 can be pivotably connected to the connecting rod 648. A corner (not labeled) of the linkage portion 662 and the resisting portion 664 can be pivotably connected to the fastening plate 24.

In the illustrated embodiment, the support member 20 can further include a plurality of assembling bases 28. The assembling base 28 can be configured to connect the rotating member 66 to the fastening plate 24. Each of the assembling bases 28 can include a main body 282 and two projecting ears 284 vertically extending from two opposite sides of the main body 282. The main body 282 can be positioned on a surface (not labeled) of the fastening plate 24 away from the heel block 26. The corner (not labeled) of the linkage portion 662 and the resisting portion 664 can be positioned between the two projecting ears 284. A first rotating axle 70 can pass through the two projecting ears 284 and the rotating member 66 to pivotably connect the rotating member 66 to the fastening plate 24.

In the illustrated embodiment, a sliding groove 6624 can be defined on a free end of the linkage portion 662. The fastening end 42 can be received in the sliding groove 6624. The fastening end 42 can be pivotably connected to the linkage portion 662 via a second rotating axle 71 passing through the fastening end 42 and the sliding groove 6624. The fastening end 42 can move along the sliding groove 6624.

In the illustrated embodiment, an assembling groove 6642 can be defined on the free end of the resisting portion 664 away from the resisting portion 664. An end of the connecting rod 648 with the through groove 6482 can be received in the assembling groove 6642. The free end of the resisting portion 664 can be pivotably connected to the connecting rod 648 via a third rotating axle 72 passing through the assembling groove 6642 and the through groove 6482. The resisting portion 664 can move along the assembling groove 6642.

Figure 5:
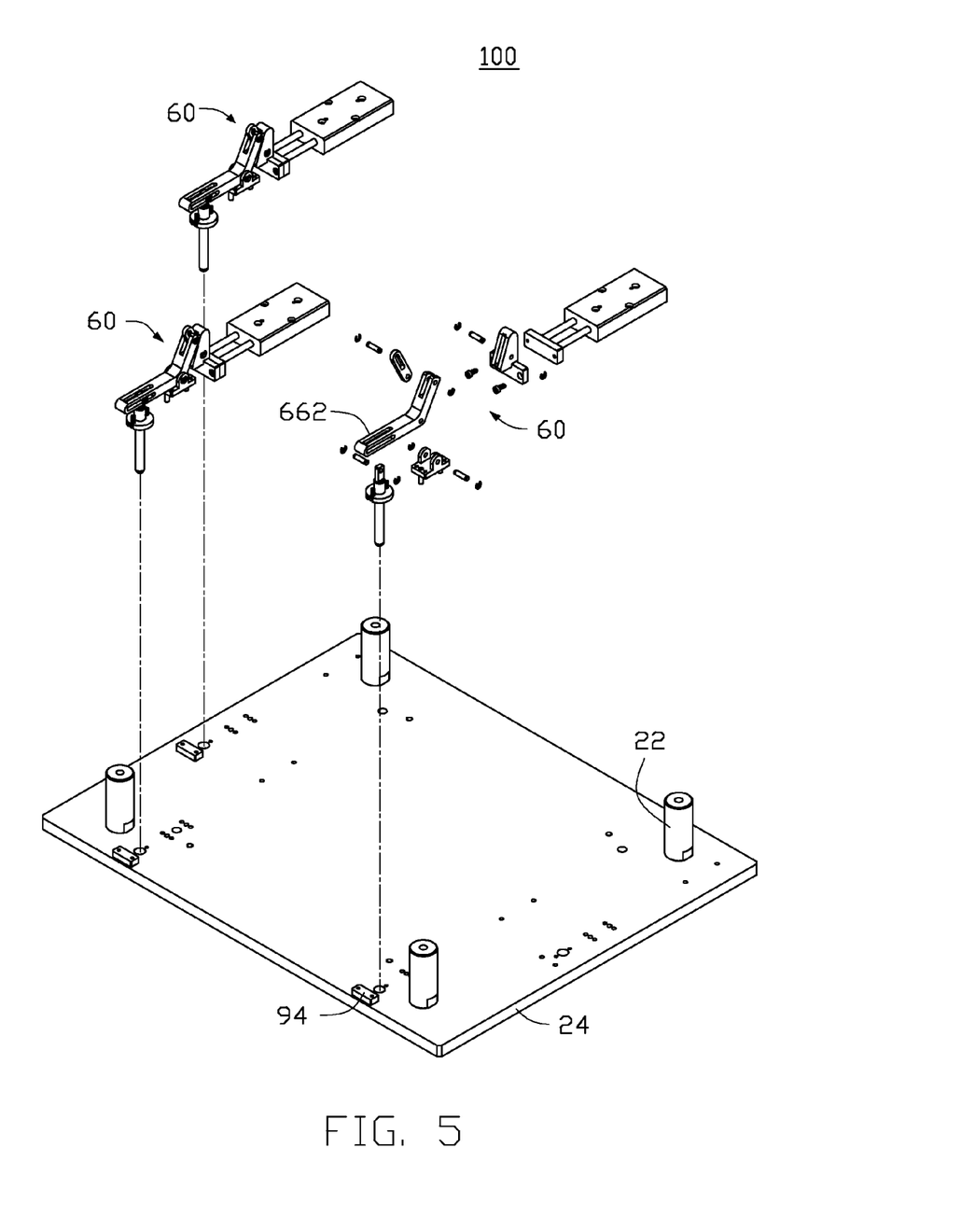
FIG. 5 is an exploded, isometric view of the positioning device of FIG. 3 from another perspective.
Figure 6:
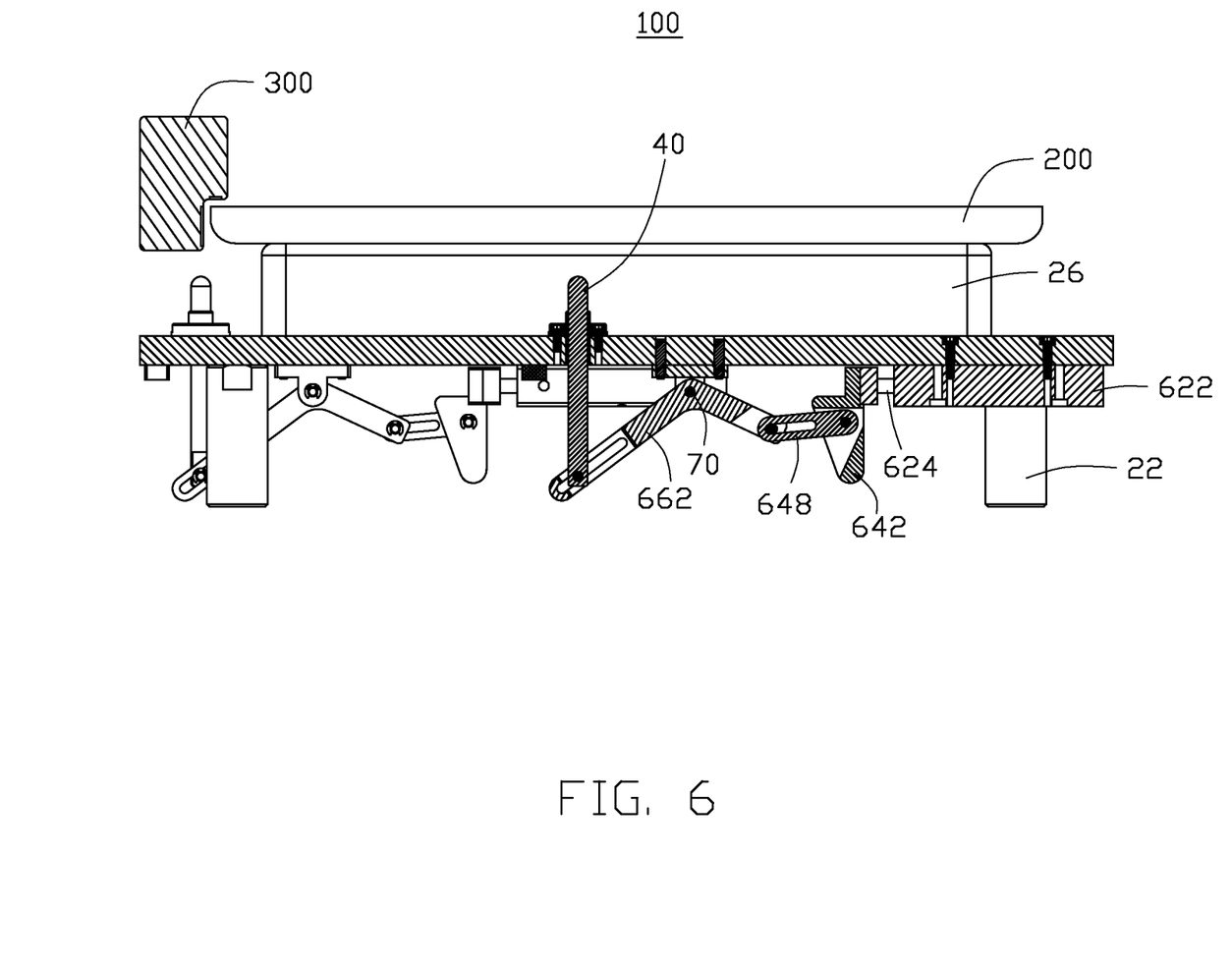
FIG. 6 is a cross-sectional view of the positioning device of FIG. 1 while the workpiece is detected.

In the illustrated embodiment, FIG. 5 illustrates that the positioning device 100 can further include a plurality of restriction members 94 positioned on the surface of the fastening plate 24 away from the heel block 26 (shown in FIG. 2). The restriction members 94 can be positioned over the linkage portion 662 to restrict the movement of the linkage portion 662.

In assembly, the support columns 22 can be fastened on the fastening plate 24. The driving members 62 can be fastened on a surface of the fastening plate 24 with the support columns 22. The connecting blocks 642 can be connected to the driving members 62. An end of the connecting rods 648 can be pivotably connected to the connecting blocks 642. The rotating members 66 can be pivotably connected to the fastening plate 24 via the assembling bases 28. An end of the rotating members 66 adjacent to the driving members 62 can be pivotably connected to the connecting rods 648. The positioning pins 40 can slidably pass through the fastening plate 24. The positioning pins 40 can be pivotably connected to an end of the rotating members 66 away from the driving member 62. Finally, the heel block 26 can be positioned on a surface of the fastening plate 24 away from the driving members 62.

FIGS. 2 to 6 illustrate that, in use, the connecting blocks 642 can move to the rotating members 66 via the driving members 62. The inclining planes 6462 of the connecting blocks 642 can resist against the resisting portions 664 to rotate the rotating members 66 around the first rotating axles 70. The positioning pins 40 can move away from the fastening plate 24 via the linkage portions 662. The positioning pins 40 can stop moving when the linkage portions 662 resist against the restriction members 94. The positioning pins 40 can extend out of the fastening plate 24 with a predetermined length. The workpiece 200 can be positioned on the heel block 26 and can resist against the positioning pins 40 to position the workpiece 200. In a detecting process, the connecting blocks 642 can move away from the rotating members 66 via the driving members 62. The connecting rods 648 can rotate via the connecting blocks 642. The resisting portions 664 can rotate around the third rotating axles 72. The positioning pins 40 can move to the fastening plate 24 via the linkage portions 662 to reduce the length of extension out of the fastening plate 24. The sensor 300 can move around the workpiece 200 to detect the workpiece 200. The sensor 300 cannot be stopped moving by the positioning pins 40.

Figure 7:
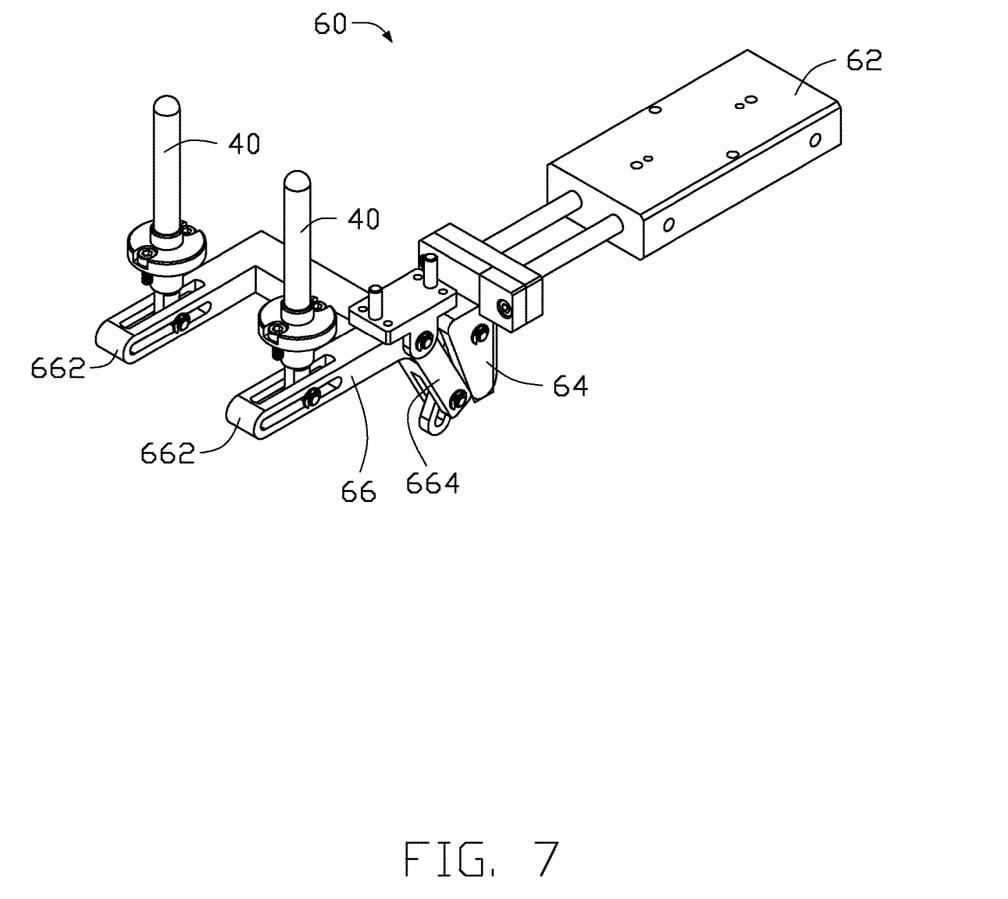
FIG. 7 is an isometric view of a telescoping mechanism, in accordance with another embodiment of this disclosure.

In other embodiments, FIG. 7 illustrates that the resisting portion 664 can be connected to a plurality of the linkage portions 662 to make the telescoping mechanism 60 control a plurality of the positioning pins 40. In the illustrated embodiment, the resisting portions 664 can be connected to the two linkage portions 662 to make the telescoping mechanism 60 control the two positioning pins 40.

In other embodiments, the assembling bases 28 and the fastening plate 24 can be integral. The main body 282 can be removed, and the two projecting ears 284 can be directly formed extending from the fastening plate 24.

In other embodiments, the connecting members 64 can be removed. The driving members can be directly connected to the rotating members 66, and there is no interference from driving the rotating members 66 rotate.

In other embodiments, the heel block 26 can be removed. The workpiece 200 can be directly positioned on the fastening plate 24, and there is no interference from detecting the workpiece 200.

In other embodiments, the second main body 644 and the projection portion 646 can be integral.

In other embodiments, a plurality of latching rings 80 can be positioned on opposite ends of the first rotating axles 70, the second rotating axles 71, and the third rotating axles 72 to prevent the first rotating axles 70, the second rotating axles 71, and the third rotating axles 72 from dropping.

In other embodiments, the driving members 62 can be positioned on a surface of the fastening plate 24 facing the workpiece 200. The axles 624 can pass through the fastening plate 24 and can control the rotating members 66.

As described above, the driving members 62 can rotate the rotating members 66 to make the positioning pins 40 move away from the support member 20. The positioning pins 40 can extend out of the fastening plate 24 with a predetermined length to position the workpiece 200. At same time when the workpiece 200 is detected, the positioning pins 40 can move to the support member 20 via the driving members 62 to prevent the sensor 300 from being stopped by the positioning pins 40 improving the detection accuracy and the detection efficiency for the sensor 300 via the positioning device 100.

The embodiments shown and described above are only examples. Many details are often found in the art such as the other features of a positioning device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including matters of shape, size and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A positioning device configured to position and detect a workpiece using a sensor, the positioning device comprising:
    a support member configured to support the workpiece;
    a plurality of pins positioned on the support member; and
    a plurality of telescoping mechanisms positioned on the support member, each of the plurality of telescoping mechanisms comprising a driving member, a rotating member, and a connecting member connecting the driving member to the rotating member;
    wherein the connecting member comprises a connecting block and a connecting rod, the connecting block is fastened to the driving member, and an end of the connecting rod is pivotably connected to a side of the connecting block away from the driving member;
    wherein the driving member is fastened to the support member, the rotating member is pivotably connected to the support member, and an end of the rotating member is pivotably connected to an end of the connecting rod away from the connecting block;
    wherein each of the plurality of positioning pins slidably passes through the support member and is pivotably connected to an opposite end of the rotating member away from the driving member; and
    wherein the rotating member rotates relative to the support member via the driving member to adjust a extending length of each of the plurality of positioning pins relative to the support member.

2. The positioning device as claimed in claim 1, wherein a through groove is defined on an end of the connecting rod away from the connecting block, and the through groove extends along a length of the connecting rod.

3. The positioning device as claimed in claim 2, wherein the connecting member comprises a rotating axle, the rotating axle passes through the rotating member and the through groove to pivotably connect the rotating member to the connecting rod, and the rotating member moves along the through groove.

4. The positioning device as claimed in claim 1, wherein the rotating member comprises a linkage portion and a resisting portion connected to the linkage portion, the resisting portion is bent and extend from an end of the linkage portion, and a corner of the linkage portion and the resisting portion is pivotably connected to the support member.

5. The positioning device as claimed in claim 4, wherein one of the plurality of positioning pins is pivotably connected to an end of the linkage portion away from the resisting portion, and the connecting rod is pivotably connected to the resisting portion.

6. The positioning device as claimed in claim 4, wherein a inclining plane is formed on a side of the connecting block facing the rotating member, and the inclining plane resists against the resisting portion.

7. The positioning device as claimed in claim 6, wherein a sliding groove is defined on an end of the linkage portion away from the resisting portion, and one of the plurality of positioning pins is pivotably connected to the sliding groove and moves along the sliding groove.

8. The positioning device as claimed in claim 6, wherein the positioning device further comprises a plurality of restriction members positioned on a surface of the support member with the telescoping mechanisms, and the plurality of restriction members is positioned over the linkage portion to restrict the movement of the linkage portion.

9. The positioning device as claimed in claim 1, wherein a plurality of positioning holes is defined in the supporting member, and each of the plurality of positioning pins slidably passes through the corresponding one of the plurality of positioning holes.

10. The positioning device as claimed in claim 9, wherein the support member comprises a plurality of guide sleeves, and each of the plurality of guide sleeves is positioned on the corresponding positioning hole to guide the plurality of positioning pins.

11. The positioning device as claimed in claim 1, wherein the support member further comprises a plurality of support columns, a fastening plate, and a heel block configured to support the workpiece, the plurality of support columns is positioned on a surface of the fastening plate away from the workpiece, and the heel block and the telescoping mechanisms are positioned on an opposite surface of the fastening plate.

12. The positioning device as claimed in claim 11, wherein the heel block is made of flexible material.

* * * * *